E. G. SCHLEICHER.
VEHICLE WHEEL.
APPLICATION FILED NOV. 11, 1914.

1,173,124.

Patented Feb. 22, 1916.

Witnesses:
William Miller
Chris. H. Ahnstedt

Inventor
Edward G. Schleicher
By his Attorneys
Hauff & Harland

UNITED STATES PATENT OFFICE.

EDWARD G. SCHLEICHER, OF STAMFORD, CONNECTICUT.

VEHICLE-WHEEL.

1,173,124.　　　　Specification of Letters Patent.　　Patented Feb. 22, 1916.

Application filed November 11, 1914. Serial No. 871,461.

*To all whom it may concern:*

Be it known that I, EDWARD G. SCHLEICHER, a citizen of the United States, residing at Stamford, county of Fairfield, State of Connecticut, have invented new and useful Improvements in Vehicle-Wheels, of which the following is a specification.

This invention relates to vehicle wheels which are essentially adapted for use with heavy trucks or motor vehicles.

The object of the invention is to provide a wheel in which the parts when worn can be readily dismounted when desired so that new parts can be substituted.

Another object of the invention is to provide a wheel with yielding auxiliary tread portions adjacent to each other to coact with the ground when the wheel drops into a rut or at times when a load is sustained by the main tread.

A further object of the invention is to construct the web of the wheel with a plurality of layers of disk shaped wood having interlocking devices located at the periphery thereof for engagement with an elastic tire.

Another object of the invention provides means whereby the auxiliary treads are prevented from circumferentially creeping or being laterally displaced.

Figure 1:
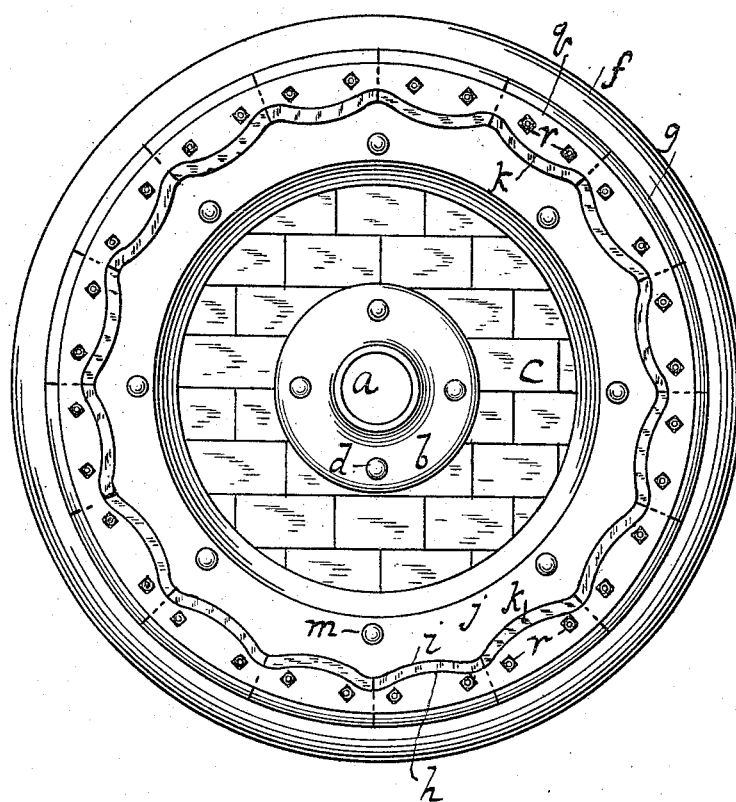
Figure 2:
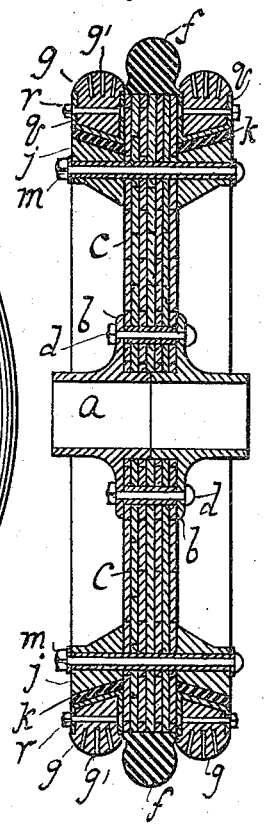
Figure 3:
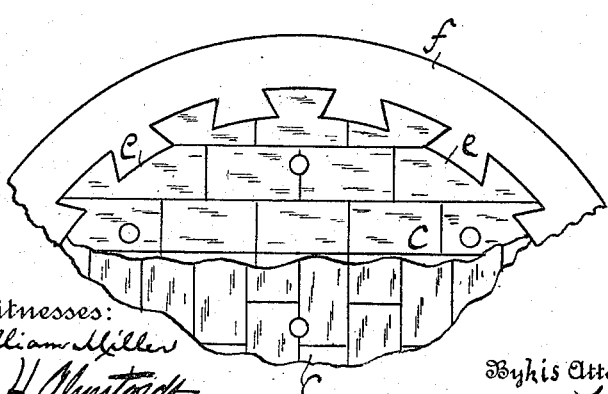
Figure 4:
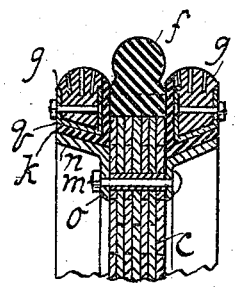

The novel features of the invention are more fully described in the following specification and claims and illustrated in the accompanying drawing in which:

Figure 1 represents a side elevation of a wheel embodying this invention. Fig. 2 is a transverse section of the same. Fig. 3 is a detail side elevation showing the auxiliary treads removed. Fig. 4 is a detail transverse section of a modification.

In this drawing is shown a wheel consisting of a tubular hub *a* made in two parts each part being provided with an annular flange *b*. These hubs serve for mounting a web *c* which is fastened to the hub by means of a series of bolts *d* extending through the web and coacting with the flanges. The web is constructed of a number of superimposed disks of wood cemented or glued together. Each disk is built up of a series of strips of wood the edges being cemented together by gluing or otherwise. The disks are so placed in relation to each other that the grain of one layer will run at different angles to the other layer, so as to prevent warping and consequent splitting of the wood. The disk has dove-tailed portions *e* formed in the circumference of the web. These dove-tailed portions serve to engage the dove-tailed inner face of an annular solid rubber tire *f*. This tire constitutes the central tread of the wheel, and the dove-tailed connections form an interlocking arrangement between the tire and the web whereby the tire is firmly mounted onto the web of the wheel.

On each side of the web is positioned a supplemental annular tread or rim member *g* having a curved periphery for contact with the ground, and provided with a scalloped inner portion *h* to correspond with the scalloped portions *i* of an annular inner rim member *j*. One, or as shown, a series of rubber cushions *k* are positioned between the scalloped faces of the rims to give the tread rim yielding contact with the ground. This way of connecting the rims obviates circumferential movement of the tread members and the cushions. Each of these rims have inclined or wedge shaped inner faces as indicated in Fig. 2 so that when these parts are assembled on the wheel the outer movable rim *g* cannot be displaced, but will have a tendency to hug the face of the web. The rim members *j* are detachably secured to the web by means of a series of bolts *m* extending through each rim and the web. This construction constitutes a simple method of dismounting the tread members *g* without removing the web or other portions of the built up wheel, merely by removing the bolt *m* and the rim *j*.

The supplemental tread members and the rim members are preferably formed of indurated fiber or other tough waterproof material so that moisture will have no effect on the material. Embedded in this material are a series of pins *g'* to grip the ground and prevent excessive wear of the tire.

When the rim members are in place on the web the outer movable members *g* will prevent lateral shift of the elastic tire, but when the movable members are dismounted the tire can be slid sidewise from the interlocking dovetailed connections and thus readily removed from the wheel. The inner portion of the tire is somewhat wider and when the tire is in place the tread members *g* will compress these portions of the tire so as to clench it in place to firmly hold it against lateral movement. Each of these tread members as indicated in Fig. 1 are arranged in the form of a series of segmental sections mounted in a casing *q* and secured in place by means of a plurality of bolts *r*, coacting with the casing and the tread, hence when a section becomes worn it can easily be replaced without removing the whole tread.

As indicated in Fig. 4 the tread members *g* are mounted on brackets or rims *n* having annular flanges *o* for securing the rims to the web. The cushion *k* in this construction extends outwardly along the inner side of the tread *g* thereby forming a buffer for absorbing lateral shocks given to the treads.

I claim:—

1. In a vehicle wheel the combination with a rim, of a tire arranged on the rim, auxiliary tread members having inclined inner portions mounted on each side of the rim to coact with the sides of the tire, and supplemental rim members having corresponding inclined portions to engage the inclined portions of the auxiliary treads.

2. In a vehicle wheel the combination with a rim, of a yielding detachable tire centrally arranged on the rim, auxiliary tread members having inclined inner portions mounted on each side of the rim to coact with each side of the tire, and detachable rim supplemental members having corresponding inclined portions to engage the inclined portions of the auxiliary treads.

3. In a vehicle wheel the combination with a rim, of a yielding detachable tire centrally arranged on the rim, auxiliary segmental tread members having inclined inner portions mounted on each side of the rim to coact with the side portions of the tire, said auxiliary treads being of smaller diameter than the tire, and detachable supplemental rim members having corresponding inclined portions to engage the inclined portions of the auxiliary treads.

4. A vehicle wheel comprising a rim or web, a yielding tire centrally arranged on the web, annular tread members having scalloped inner portions arranged on each side of the web, detachable means including rim members mounted on each side of the web coacting with the scalloped portions of the tread, and elastic devices located between the tread members and the detachable means.

5. A vehicle wheel comprising a rim or web, a yielding tire centrally arranged on the web, annular tread members having scalloped wedge shaped inner portions arranged on each side of the web, detachable means including rim members mounted on each side of the web having corresponding scallops and wedge portions coacting with the scalloped portions of the tread members, and elastic devices interposed between the scallops.

In testimony whereof I have hereunto set my hand in the presence of two subscribing witnesses.

EDWARD G. SCHLEICHER.

Witnesses:
 CHRISTIAN H. OLMSTAEDT,
 WILLIAM MILLER.

Copies of this patent may be obtained for five cents each, by addressing the "Commissioner of Patents, Washington, D. C."